United States Patent
Raghunathan et al.

(10) Patent No.: US 9,780,575 B2
(45) Date of Patent: Oct. 3, 2017

(54) SYSTEM AND METHOD FOR CONTACTLESS EXCHANGE OF POWER

(71) Applicant: GENERAL ELECTRIC COMPANY, Schenectady, NY (US)

(72) Inventors: Arun Kumar Raghunathan, Bangalore (IN); Somakumar Ramachandrapanicker, Bangalore (IN); Suma Memana Narayana Bhat, Bangalore (IN); Satishbabu Bhogineni, Guntur (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 147 days.

(21) Appl. No.: 14/807,427

(22) Filed: Jul. 23, 2015

(65) Prior Publication Data

US 2016/0043568 A1    Feb. 11, 2016

(30) Foreign Application Priority Data

Aug. 11, 2014 (IN) ............................ 3949/CHE/2014

(51) Int. Cl.
*H02J 5/00* (2016.01)
*B60L 11/18* (2006.01)
*H02J 7/02* (2016.01)

(52) U.S. Cl.
CPC .............. *H02J 5/005* (2013.01); *B60L 11/182* (2013.01); *H02J 7/025* (2013.01)

(58) Field of Classification Search
CPC .......... H02J 5/005; H02J 7/025; B60L 11/182
USPC .......................................................... 307/104
See application file for complete search history.

(56) References Cited

U.S. PATENT DOCUMENTS

| | | | |
|---|---|---|---|
| 5,654,621 | A | 8/1997 | Seelig |
| 6,906,495 | B2 | 6/2005 | Cheng et al. |
| 6,912,137 | B2 | 6/2005 | Berghegger |
| 6,960,968 | B2 | 11/2005 | Odendaal et al. |
| 8,638,062 | B2 | 1/2014 | Baarman et al. |
| 8,674,550 | B2 | 3/2014 | Bohori et al. |
| 2009/0278666 | A1 | 11/2009 | Yoda et al. |

(Continued)

FOREIGN PATENT DOCUMENTS

| | | |
|---|---|---|
| CN | 102299391 A | 12/2011 |
| CN | 203434641 U | 2/2014 |

(Continued)

OTHER PUBLICATIONS

Zountouridou et al., "An evaluation study of wireless access technologies for V2G communications", Intelligent System Application to Power Systems (ISAP), 2011 16th International Conference on, IEEE Xplore, pp. 1-7, Sep. 25-28, 2011.

(Continued)

*Primary Examiner* — Robert Deberadinis
(74) *Attorney, Agent, or Firm* — Peter T. DiMauro; GE Global Patent Operation (57) ABSTRACT

A contactless power transfer system is provided. The contactless power transfer system includes a first power exchanging coil configured to exchange power, a power mating coil operatively coupled to a switching unit, and a controller operatively coupled to the switching unit. The controller is configured to control switching operations of the switching unit to actively control a current in the power mating coil to match an impedance of the first power exchanging coil and enable the exchange of power.

20 Claims, 9 Drawing Sheets

(56) References Cited

U.S. PATENT DOCUMENTS

| | | |
|---|---|---|
| 2010/0065352 A1 | 3/2010 | Ichikawa |
| 2010/0164298 A1 | 7/2010 | Karalis et al. |
| 2011/0140429 A1 | 6/2011 | Bohori et al. |
| 2011/0278018 A1 | 11/2011 | Fenton et al. |
| 2011/0309687 A1 | 12/2011 | Bohori et al. |
| 2011/0315496 A1 | 12/2011 | Bohori et al. |
| 2012/0025942 A1 | 2/2012 | Bhat et al. |
| 2012/0245649 A1 | 9/2012 | Bohori et al. |
| 2012/0268238 A1 | 10/2012 | Park et al. |
| 2012/0306281 A1 | 12/2012 | Bohori et al. |
| 2013/0020862 A1 | 1/2013 | Miller |
| 2013/0021168 A1 | 1/2013 | Jones et al. |
| 2013/0024059 A1 | 1/2013 | Miller et al. |
| 2013/0062966 A1 | 3/2013 | Verghese et al. |
| 2013/0093390 A1 | 4/2013 | Partovi |
| 2013/0249479 A1 | 9/2013 | Partovi |
| 2013/0285604 A1 | 10/2013 | Partovi |
| 2013/0285605 A1 | 10/2013 | Partovi |
| 2013/0300204 A1 | 11/2013 | Partovi |
| 2014/0028110 A1 | 1/2014 | Petersen et al. |
| 2014/0049118 A1 | 2/2014 | Karalis et al. |
| 2014/0062181 A1 | 3/2014 | Bohori et al. |

FOREIGN PATENT DOCUMENTS

| | | |
|---|---|---|
| WO | 2011112795 A1 | 9/2011 |
| WO | 2013059441 A1 | 4/2013 |
| WO | 2013095065 A1 | 6/2013 |

OTHER PUBLICATIONS

Bedogni et al., "An interoperable architecture for mobile smart services over the internet of energy", World of Wireless, Mobile and Multimedia Networks (WoWMoM), 2013 IEEE 14th International Symposium and Workshops on, IEEE Xplore, pp. 1-6, Jun. 4-7, 2013.

European Search Report and Opinion issued in connection with corresponding EP Application No. 15178704.1 on Jan. 8, 2016.

Kurs et al., "Wireless Power Transfer via Strongly Coupled Magnetic Resonances", Annals of Physics, vol. No. 317, pp. 83-86, Jul. 6, 2007.

Villa et al., "Design of a high frequency Inductively Coupled Power Transfer System for Electric Vehicle Battery charge", Applied Energy, vol. No. 86, Issue No. 3, pp. 355-363, Mar. 2009.

Villa et al., "Development of an inductively coupled power transfer system (ICPT) for electric vehicles with a large air gap", pp. 1-6, 2012.

SYSTEM AND METHOD FOR CONTACTLESS EXCHANGE OF POWER

BACKGROUND

Embodiments of the invention generally relate to power transfer systems and, more particularly, to systems for contactless exchange of power.

Power transfer systems are employed for transmitting power from one object to another. Based on a method of transmitting power, the power transfer systems may be classified into power transfer systems using physical connections between a transmitter and a receiver for transmitting power and systems for contactless exchange of power in which there is no physical connection between the transmitter and the receiver.

The systems for contactless exchange of power may employ various methods for transmitting power wirelessly. One such approach may include an inductive coupling system that may further include a transmitter coil and a receiver coil. In this approach, both the transmitter coil and the receiver coil may be inductively coupled to a respective transformer winding and may transmit power based on inductive coupling.

In an alternative approach, a resonator based system for contactless exchange of power may be used. One such resonator based system may include a three coil system. The three coil system may include a transmitter coil, a receiver coil and a resonator for enhancing a resonance coupling between the transmitter coil and the receiver coil. In another approach multiple resonators may also be used for contactless exchange of power.

Although all the aforementioned approaches exchange power using a contactless medium, none of the approaches provide a flexibility of using the transmitter coil and/or the receiver coil with different specifications. In certain applications such as EV charging, the transmitter coil or the charging station may have one set of specifications which may not be compatible with the receiver coil in a vehicle. Such incompatibility issues between the transmitter coil and the receiver coil may create undesirable restrictions for a consumer which need to be addressed using an improved system.

BRIEF DESCRIPTION

Briefly, in accordance with one embodiment, a contactless power transfer system is provided. The contactless power transfer system includes a first power exchanging coil configured for contactless exchange of power, a power mating coil operatively coupled to a switching unit, and a controller operatively coupled to the switching unit. The controller is configured to control switching operations of the switching unit to actively control a magnitude and a phase of current in the power mating coil to match an impedance of the first power exchanging coil and enable a contactless exchange of power.

In another embodiment, a system for contactless exchange of power is provided. The system includes a contactless power transfer system that includes a first power exchanging coil configured for contactless exchange of power, a power mating coil operatively coupled to a switching unit, and a controller operatively coupled to the switching unit. The controller is configured to control switching operations of the switching unit to actively control a magnitude and a phase of current in the power mating coil to match an impedance of the first power exchanging coil and enable a contactless exchange of power. The system also includes a second power exchanging coil operatively coupled to the contactless power transfer system and configured to exchange power with the first power exchanging coil via a magnetic field.

In yet another embodiment, a method for contactless exchange of power is provided. The method includes operatively coupling a first power exchanging coil having first impedance and a second power exchanging coil having a second impedance. The method also includes operatively coupling the first power exchanging coil to a power mating coil. The method further includes actively controlling a magnitude and a phase of current in the power mating coil to modify the first impedance of the first power exchanging coil to match the second impedance of the second power exchanging coil and enable contactless exchange of power between the first power exchanging coil and the second power exchanging coil.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Embodiments of the present invention include system and a method for contactless exchange of power. The system includes a contactless power transfer system that further includes a first power exchanging coil configured for contactless exchange of power, a power mating coil operatively coupled to a switching unit, and a controller operatively coupled to the switching unit. The controller is configured to control switching operations of the switching unit to actively control a magnitude and a phase of current in the power mating coil to match an impedance of the first power exchanging coil and enable a contactless exchange of power. The system also includes a second power exchanging coil operatively coupled to the contactless power transfer system and configured for contactless exchange of power with the first power exchanging coil via a magnetic field.

Unless defined otherwise, technical and scientific terms used herein have the same meaning as is commonly understood by one of ordinary skill in the art to which this disclosure belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean one, some, or all of the listed items. The use of "including," "comprising" or "having" and variations thereof herein are meant to encompass the items listed thereafter and equivalents thereof as well as additional items. Specifically, unless indicated otherwise, the term "coupled" includes resonance coupling that is defined as a coupling between two or more resonators such that they are able to exchange power when excited at a particular frequency. The terms "exchange" and "transfer" may be used interchangeably in the specification and convey the same meaning. Unless specified otherwise, the term "exchange" may be defined as a contactless exchange of power for the purposes of this specification.

Figure 1:
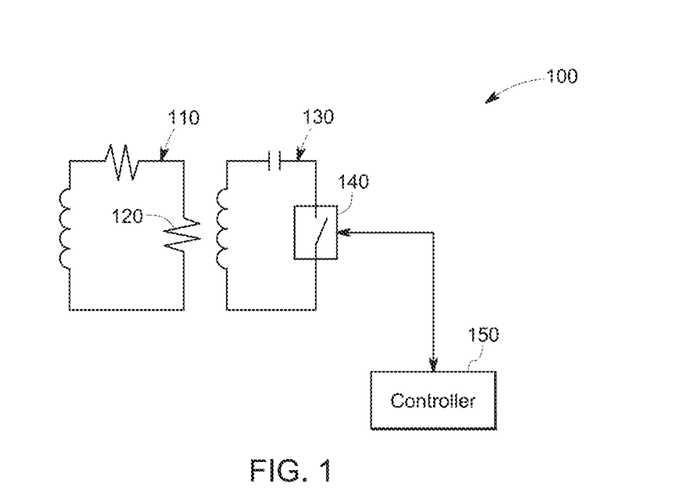
FIG. 1 is a schematic representation of a contactless power transfer system in accordance with an embodiment of the invention.

FIG. 1 is a schematic representation of a contactless power transfer system 100 in accordance with an embodiment of the invention. The contactless power transfer system 100 includes a first power exchanging coil 110 configured to exchange power. The first power exchanging coil 110 is operatively coupled to a load 120 which receives power from the first power exchanging coil 110. The first power exchanging coil 110 is magnetically coupled to a power mating coil 130. The power mating coil 130 is operatively coupled to a switching unit 140. In one embodiment, the switching unit 140 may include an insulated gate bipolar transistor (IGBT), a silicon controlled rectifier (SCR), a metal-oxide semiconductor field effect transistor (MOSFET), or a mechanical switch. The switching unit 140 is employed to vary a magnitude and a phase of current in the power mating coil 130 for matching an impedance of the first power exchanging coil 110. To this end, the switching unit 140 is operatively coupled to a controller 150 that controls switching operations of the switching unit 140. The controller 150 actively controls the magnitude and the phase of current in the power mating coil 130 to match the impedance of the first power exchanging coil 110, which further enables the exchange of power. Further details of active control of the magnitude and the phase of current by the controller 150 are discussed later in the specification. Hereinafter, the term "active control" may be defined as a control scheme which uses an external gate pulse to transition the switching unit 140 between a conducting state and a non-conducting state. Such external gate pulses may be provided by the controller 150 to the switching unit 140 for varying the magnitude and the phase of current in the power mating coil 130 and matching the impedance of the first power exchanging coil 110.

Figure 2:
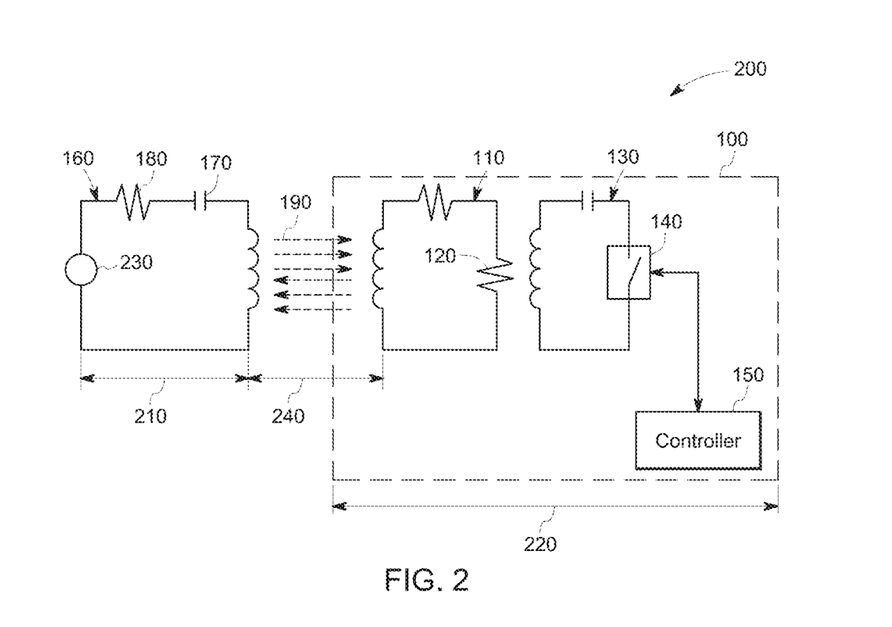
FIG. 2 is a schematic representation of a system for contactless exchange of power including the contactless power transfer system of FIG. 1 in accordance with an embodiment of the invention.

Referring to FIG. 2, the contactless power transfer system 100 may be operatively coupled to a second power exchanging coil 160 to form a system for contactless exchange of power 200 as depicted in FIG. 2. The second power exchanging coil 160 is operatively coupled to a coil capacitor 170 and may include an internal resistance depicted by resistance 180. The first power exchanging coil 110 in the contactless power transfer system 100 exchanges power with the second power exchanging coil 160 via a magnetic field 190. In an exemplary embodiment, the second power exchanging coil 160 may be configured to operate as a transmitter coil and the first power exchanging coil 110 may be configured to operate as a receiver coil. However, any one of the first power exchanging coil 110 or the second power exchanging coil 160 may be configured to operate as the transmitter coil or the receiver coil in different embodiments based on system requirements. In some embodiments, power exchanging coils 110 and 160 may act as both transmitter and receiver simultaneously allowing for simultaneous bidirectional exchange of power. For example, the contactless power transfer system 100 may be provided at a transmitter end 210 in the system 200. In such a configuration, the first power exchanging coil 110 may transmit power to the second power exchanging coil 160. Similarly, the contactless power transfer system 100 may also be provided at a receiver end 220 in the system 200 and the first power exchanging coil 110 may be configured to receive power from the second power exchanging coil 160. In one embodiment, a field focusing element (FIG. 3) may be added to the system 200 for contactless exchange of power to enhance coupling between the first power exchanging coil 110 and the second power exchanging coil 160. In another embodiment, one or more repeater resonators (not shown) may be added to the system 200 for contactless exchange of power to increase a predetermined distance (FIG. 3) between the first power exchanging coil 110 and the second power exchanging coil 160. In some embodiments, the system 200 for contactless exchange of power may include the field focusing element, the one or more repeater resonators, or a combination thereof. In another embodiment, the field focusing element, the one or more repeater resonators or both may be placed at the transmitter end 210, the receiver end 220 or a combination thereof. For better understanding, an embodiment where the contactless power transfer system 100 is provided at the receiver end 220 in the system 200 for exchanging power is discussed.

In a specific embodiment, and with continued reference to FIG. 2, the second power exchanging coil 160 may be electrically coupled to a power source 230 and the first power exchanging coil 110 may be electrically coupled to the load 120. In an exemplary embodiment, the load 120 may include an energy storage device. The second power exchanging coil 160 receives power from the power source 230 and converts the power into the magnetic field 190. The power is transmitted to the contactless power transfer system 100 via the magnetic field 190. As disclosed above, the contactless power transfer system 100 includes the power mating coil 130 to match impedance of the first power exchanging coil 110 to enable exchange of power between the first power exchanging coil 110 and the second power exchanging coil 160. In one embodiment, the first power exchanging coil 110 may operate at a first operating frequency and the power mating coil 130 may operate at a second operating frequency, where the first operating frequency is different from the second operating frequency.

Initially, during operation, the contactless power transfer system 100 and the second power exchanging coil 160 are placed within a predetermined distance 240 such that a distance between the first power exchanging coil 110 and the second power exchanging coil 160 does not exceed the predetermined distance 240. It may be noted that the first power exchanging coil 110 and the second power exchanging coil 160 may not be compatible with each other and may be unable to exchange power. Such incompatibility between the first power exchanging coil 110 and the second power exchanging coil 160 may be observed due to different specifications of the first power exchanging coil 110 and the second power exchanging coil 160. In one embodiment, the specifications may include an operating frequency of the first power exchanging coil 110 and the second power exchanging coil 160, difference in a coil design of the first power exchanging coil 110 and the second power exchanging coil 160, impedance of the first power exchanging coil 110 and the second power exchanging coil 160, or any other parameter that may affect magnetic coupling between two power exchanging coils. Therefore, in order to overcome the incompatibility between the first power exchanging coil 110 and the second power exchanging coil 160, the magnitude and the phase of the current in the power mating coil 130 is actively controlled by the controller 150 to match the impedance of the first power exchanging coil 110 with the impedance of the second power exchanging coil 160.

To this end, the controller 150 performs a frequency sweep to identify a duty cycle of the switching unit 140 that may enable the exchange of power between the first power exchanging coil 110 and the second power exchanging coil 160. In one embodiment, the frequency sweep may be performed based on a hit and trial method with predetermined duty cycles. In another embodiment, the predetermined duty cycles of the switching unit 140 may be stored in a controller memory (not shown). The predetermined duty cycles may represent different operating frequencies of the switching unit 140 which in turn represent the operating frequencies of the power mating coil 130. The different operating frequencies of the power mating coil 130 result in different impedances of the first power exchanging coil 110 that may match with impedances of different second power exchanging coil configurations currently available. In one embodiment, the second power exchanging coil configurations may be updated in the controller 150 at predefined time intervals to provide compatibility and interoperability with maximum number of different second power exchanging coil configurations.

While performing the frequency sweep, the controller 150 executes each duty cycle to provide gate pulses to the switching unit 140 based on the duty cycle. The gate pulses enable the transition of the switching unit 140 between the conducting state and the non-conducting state. Such transitions actively control the magnitude and the phase of the current in the power mating coil 130. Consequently, since the power mating coil 130 is magnetically coupled to the first power exchanging coil 110, the variation in the magnitude and the phase of the current leads to a change in impedance of the first power exchanging coil 110. This change in the impedance of the first power exchanging coil 110 is used to match the impedance of the second power exchanging coil 160.

Furthermore, due to placement of the second power exchanging coil 160 within the predetermined distance 240 as discussed above, the second power exchanging coil 160 magnetically couples to the first power exchanging coil 110 when the impedance of the first power exchanging coil 110 is matched with the second power exchanging coil 160 and an exchange of power may initiate. The controller 150 uses this principle to identify the duty cycle that matches the impedance of the first power exchanging coil 110 with the impedance of the second power exchanging coil 160. In one embodiment, the controller 150 may obtain power exchange data (not shown) from the first power exchanging coil 110 and the second power exchanging coil 160 to determine if the duty cycle executed by the controller 150 matches the impedance of the first power exchanging coil 110 with the impedance of the second power exchanging coil 160. Similarly, the controller 150 executes each duty cycle until the controller 150 identifies the duty cycle that matches the impedance of the first power exchanging coil 110 with the impedance of the second power exchanging coil 160. In one embodiment, the controller 150 may execute each duty cycle sequentially or randomly. Furthermore, upon identifying the duty cycle that matches the impedance of the first power exchanging coil 110 with the second power exchanging coil 160, the controller 150 continues with the same duty cycle until exchange of power is completed. In another embodiment, the controller 150 may modify the identified duty cycle based on a change in power being exchanged, or a temperature of one or more coils in the system for contactless exchange of power 200 while exchanging power to maintain optimal efficiency and power transfer capabilities.

Figure 3:
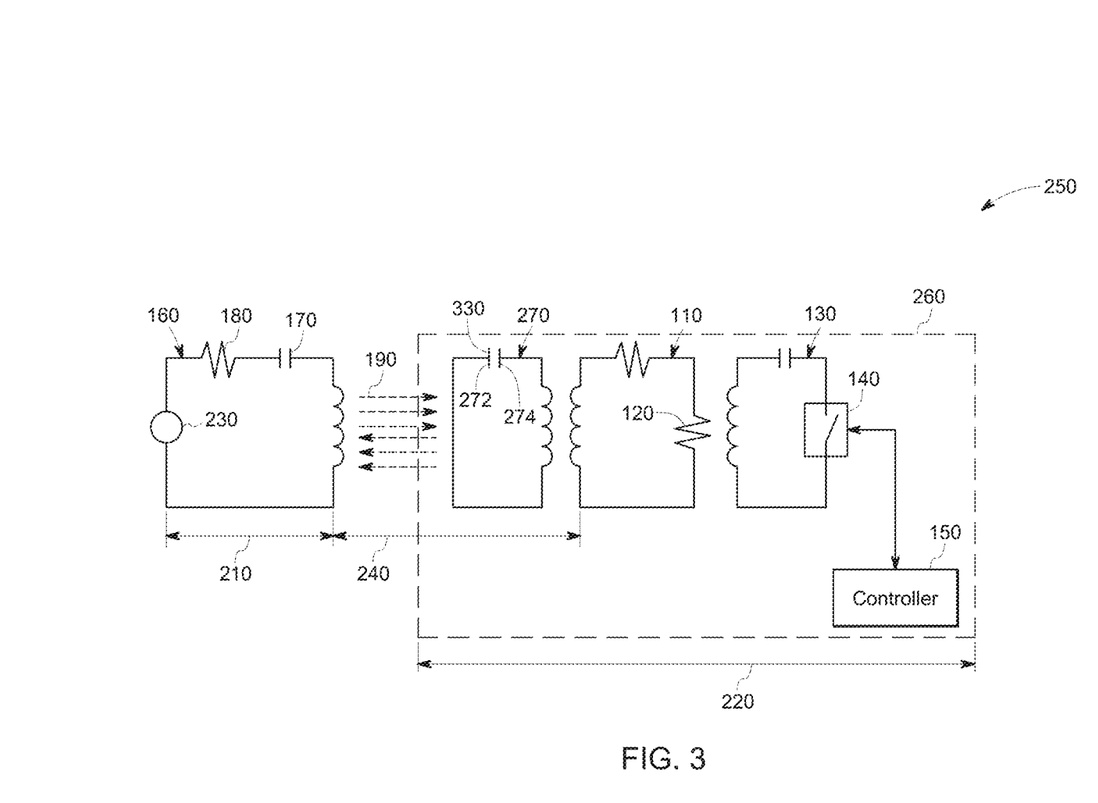
FIG. 3 is a schematic representation of a system for contactless exchange of power with a contactless power transfer system including a field focusing element operatively coupled to the first power exchanging coil in accordance with an embodiment of the invention.

FIG. 3 is a schematic representation of a system 250 for contactless exchange of power with a contactless power transfer system 260 including a field focusing element 270 operatively coupled to the first power exchanging coil 110 in accordance with an embodiment of the invention. The field focusing element 270 enhances magnetic coupling between the first power exchanging coil 110 and the second power exchanging coil 160. In one embodiment, the field focusing element 270 may be placed between the first power exchanging coil 110 and the second power exchanging coil 160. In another embodiment, the field focusing element 270 may focus the magnetic field 190 transmitted by the second power exchanging coil 160 to the first power exchanging coil 110 or transmitted from the first power exchanging coil 110 onto the second power exchanging coil 160. In a specific embodiment, the field focusing element 270 may include at least one resonator and the at least one resonator may be configured to enable a bi-directional transfer of power and data signals between the first power exchanging coil 110 and a second power exchanging coil 160.

Figure 4:
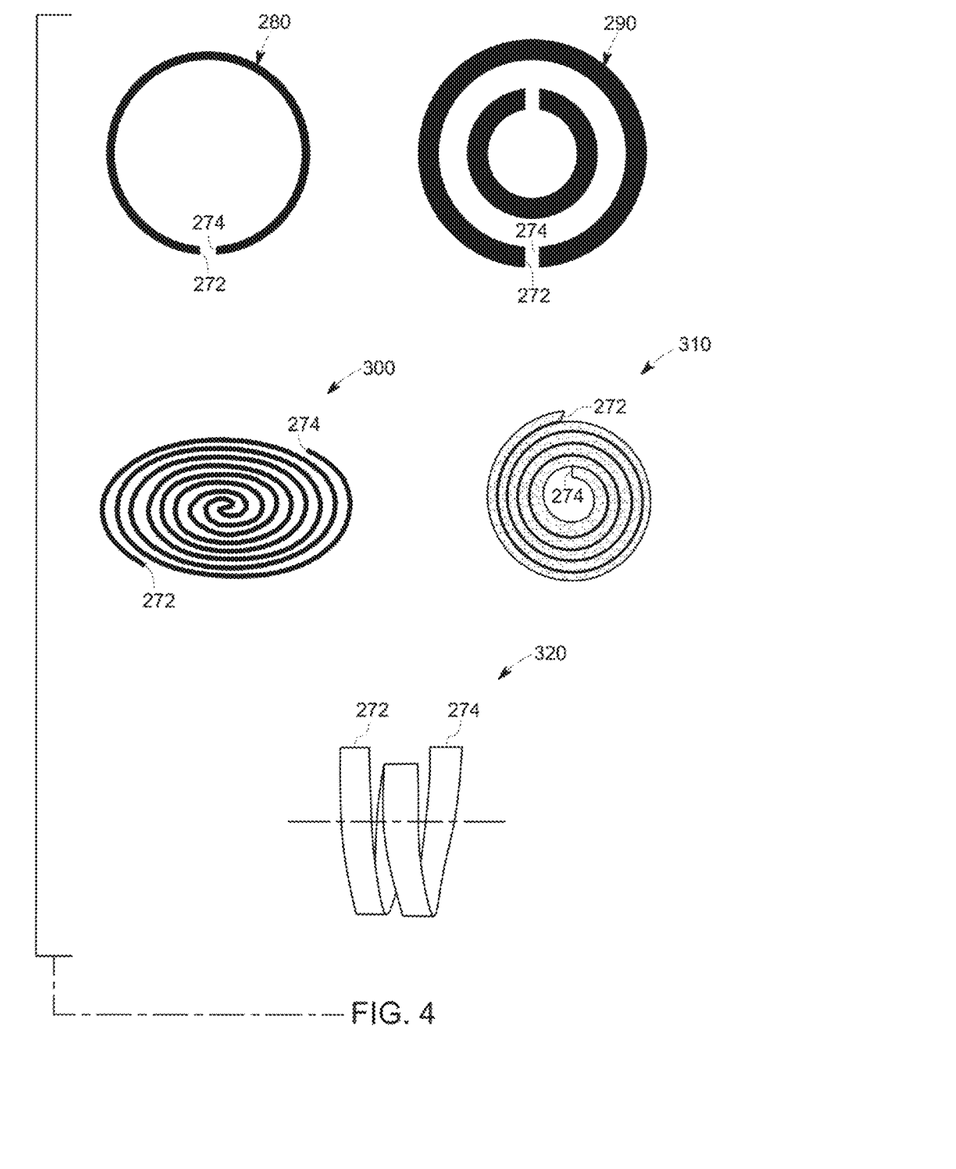
FIG. 4 is a schematic representation of various structures of resonators forming a field focusing element in accordance with an embodiment of the invention.

FIG. 4 depicts various structures of the at least one resonator that may form the field focusing element 270 in the contactless power transfer system 260 of FIG. 3. In one embodiment, the field focusing element 270 may include a single loop coil 280. In another embodiment, the field focusing element 270 may include multiple turns such as in a split ring structure 290, spiral structure 300, Swiss-roll structure 310, or helical coil 320. Selection of a structure for a particular application is determined by the size and self-resonating frequency of the field focusing element 270.

Referring back to FIG. 3, in one embodiment, ends 272, 274 (FIG. 4) of the field focusing element 270 may be coupled to a field focusing capacitor 330 that forms a capacitively loaded coil as represented in FIG. 3. Such a capacitively loaded coil upon excitation, amplifies the magnetic field 190 received from the second power exchanging coil 160 and transmits an amplified magnetic field (not shown) to the first power exchanging coil 110.

In another embodiment, the ends 272, 274 of the field focusing element 270 may be left open and the field focusing capacitor 330 may not be coupled to the ends 272, 274 of the field focusing element 270. In such an embodiment, the field focusing element 270 behaves as a self-resonant coil and when the second power exchanging coil is excited at a resonant frequency of the field focusing element 270, a standing wave current distribution may be developed within the field focusing element 270 between the ends 272, 274 of the field focusing element 270. The standing wave current distribution may lead to a non-uniform magnetic field distribution around the field focusing element 270. Such non-uniform current distribution may be configured to focus the magnetic field 190 in any desired direction, such as, in a direction of the first power exchanging coil 110 in this example. When operating at resonant frequency, even a small excitation of the field focusing element 270 produces large amplitude of current distribution along the length of the field focusing element 270. Large current magnitude of non-uniform distribution may lead to an amplified and focused magnetic field in the direction of the first power exchanging coil 110 that results in higher efficiency of power transfer. Greater details of the operation of the field-focusing element 270 are described in commonly assigned U.S. Pat. No. 8674550, issued on Mar. 18, 2014 which is hereby incorporated by reference in its entirety.

Figure 5:
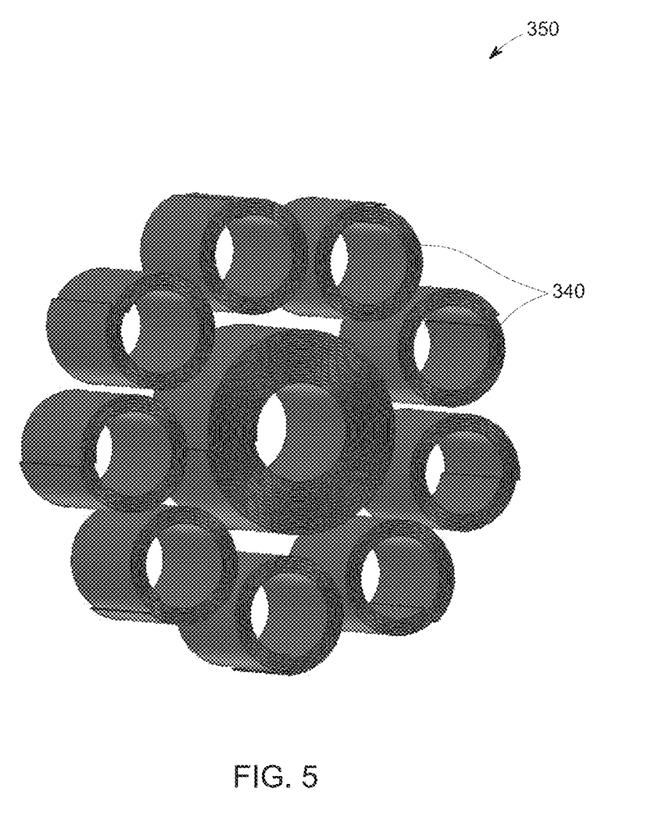
FIG. 5 is a schematic presentation of an exemplary array of resonators configured to form a field focusing element in accordance with an embodiment of the invention.

Furthermore, FIG. 5 depicts a schematic representation of an exemplary embodiment of the field focusing element 270 that may include a plurality of resonators 340 arranged in an array 350 and the plurality of resonators 340 focus a resultant magnetic field of the plurality of resonators 340 towards a direction of the first power exchanging coil 110 or the second power exchanging coil 160. More specifically, the plurality of resonators 340 arranged in the array 350 are configured to operate as a single unit where a resultant magnetic field (not shown) is established by the respective magnetic fields of the plurality of resonators 340 in the array 350 by interfering constructively (adding) in a desired direction to achieve magnetic field focusing and interfering destructively (canceling each other) in the remaining space. Although, one form of the array 350 is shown, there may be various other forms of array that can be implemented using the plurality of resonators 340. In a specific embodiment, other forms of array may include a two dimensional array or a three dimensional array. The resultant magnetic field may be transmitted to the first power exchanging coil 110 or the second power exchanging coil 160 based on the configuration of the system 250. Moreover, in a particular embodiment, the plurality of resonators 340 may be configured to operate at two or more different resonance frequencies simultaneously to enable a simultaneous bi-directional transfer of power and data signals between the first power exchanging coil 110 and the second power exchanging coil 160.

With continued reference to FIG. 3, in addition to matching the impedance of the first power exchanging coil 110 with the impedance of the second power exchanging coil 160, the power mating coil 130 may also compensate for the change in phase resulting from any misalignment of the contactless power transfer system 260 with respect to the second power exchanging coil 160, change in the load 120 at the first power exchanging coil 110, drift in characteristics such as inductance and capacitance of the first power exchanging coil 110, the second power exchanging coil 160, the power mating coil 130 and the field focusing element 270 due to ageing and environmental effects such as deposition of mud, ice water. As used herein, the term "misalignment" means any angular deviation between the second power exchanging coil (e.g., second power exchanging coil 160) and the contactless power transfer system (e.g., contactless power transfer system 260). Notably, the field focusing element 270, the first power exchanging coil 110 and the power mating coil 130 are coupled to each other in a relatively fixed position and form the contactless power transfer system 260. Any misalignment in the system 250 would be between the contactless power transfer system 260 and the second power exchanging coil 160 and should not be interpreted as a misalignment between the individual components of the contactless power system 260. In an exemplary embodiment, the first power exchanging coil 110 may be operatively coupled between the field focusing element 270 and the power mating coil 130. In one embodiment, the power mating coil 130 and the field focusing element 270, each operate at different resonant frequencies with respect to each other. In another embodiment, the resonant frequency of the power mating coil 130 is higher than the resonant frequency of the field focusing element 270. This provides a capacitive reactance to the contactless power transfer system 260 and compensates for a lagging power factor in the system 250. In one example, the power mating coil 130 operates at twice the frequency of the first power exchanging coil 110. In another embodiment, the resonant frequency of the power mating coil 130 is lower than the resonant frequency of the field focusing element 270. This provides an inductive reactance to the contactless power transfer system 260 and compensates for a leading power factor in the system 250. In an exemplary embodiment, the resonant frequency of the field focusing element 270 is equal to the resonant frequency of the second power exchanging coil 160 and therefore, by extension, the resonant frequency of the power mating coil 130 is different from the resonant frequency of the second power exchanging coil 160.

During operation, the power mating coil 130 behaves as a capacitor due to the relatively higher resonant frequency as compared to the field focusing element 270 and provides capacitive reactance to the system 250 that increases efficiency and power transfer capabilities of the system 250. The efficiency of the system 250 depends on the input power factor of the system 250 and the efficiency of the system 250 is enhanced by increasing the input power factor of the system 250. The capacitive reactance provided by the power mating coil 130 results in impedance matching and reduces the current drawn by the system 250 for transmitting power to the load 120 and hence improves the input power factor of the system 250 resulting in enhanced efficiency.

Moreover, the capacitive reactance provided by the power mating coil 130 increases the power transfer capability of the system 250 by increasing a power output of the system 250. The power output at the load 120 depends on a total reflected impedance of the system 250. The capacitive reactance provided by the power mating coil 130 reduces the total reflected impedance, which in turn increases the power transfer capability of the system 250. Due to the enhanced efficiency and the power transfer capability of the system 250, the second power exchanging coil 160 and the contactless power transfer system 260 are said to have enhanced coupling between each other.

Figure 6:
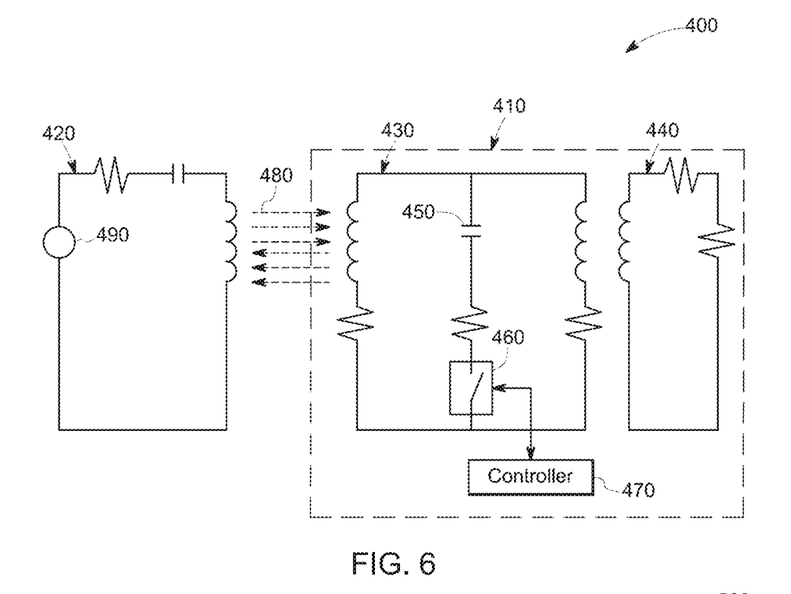
FIG. 6 is a schematic representation of another embodiment of the system for contactless exchange of power of FIG. 3 in accordance with an embodiment of the invention.

FIG. 6 is a schematic representation of another embodiment 400 of the system for contactless exchange of power of FIG. 3 in accordance with an embodiment of the invention. In this embodiment, the system 400 includes a contactless power transfer system 410 and a second power exchanging coil 420. The contactless power transfer system 410 includes a first integrated coil 430 and a first power exchanging coil 440. The first integrated coil 430 includes a field focusing element and a power mating coil electrically coupled to each other. The field focusing element and the power mating coil share a common capacitor 450 which generally has a capacitance higher than that of the capacitors used in FIG. 3. The common capacitor approach helps in reducing costs and losses when compared to the system of FIG. 3. Furthermore, the first integrated coil 430 also includes a switching unit 460 operatively coupled to the common capacitor 450. The switching unit 460 is operatively coupled to a controller 470. The second power exchanging coil 420 generates a magnetic field 480 from the power received from a power source 490 and transmits the magnetic field 480 to the contactless power transfer system 410. Further details of the operation of system can be referred from the above mentioned description of system of FIG. 3.

Figure 7:
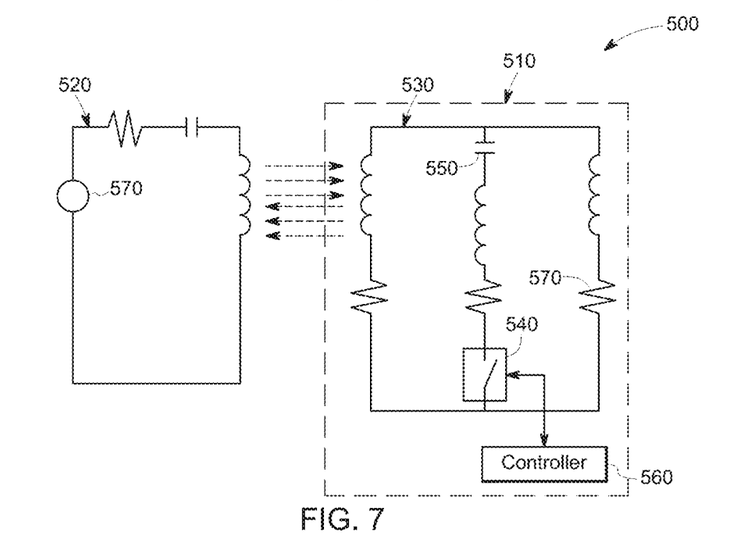
FIG. 7 is a schematic representation of yet another embodiment of the system for contactless exchange of power of FIG. 3 in accordance with an embodiment of the invention.

FIG. 7 is a schematic representation of yet another embodiment 500 of the system for contactless exchange of power of FIG. 3 in accordance with an embodiment of the invention. The present embodiment 500 includes a contactless power transfer system 510 and a second power exchanging coil 520. The contactless power transfer system 510 includes a second integrated coil 530. The second integrated coil 530 includes a field focusing element, a power mating coil and a first power exchanging coil electrically coupled to each other to form the second integrated coil 530 where the power mating coil is electrically coupled to the field focusing element between the field focusing element and the first power exchanging coil. Furthermore, the second integrated coil 530 also includes a switching unit 540 operatively coupled to a common capacitor 550. The switching unit 540 is further coupled to a controller 560 that controls switching operations of the switching unit to actively control the magnitude and the phase of the current in the second integrated coil 530. Generally, the power at the output (not shown) of the first power exchanging coil is calculated by determining a difference between power received by the first power exchanging coil and the total internal losses of the first power exchanging coil. One such component of the total internal losses may include self-inductance losses. In the present embodiment, the self-inductance losses are canceled by the capacitive reactance provided by the power mating coil resulting in higher power at a load 570 coupled to the second integrated coil 530 as compared to the conventional system (not shown). Furthermore, the present embodiment enables the second integrated coil 530 to share the one capacitor, establish resonance between the first power exchanging coil and the field focusing element, match impedance of the first power exchanging coil with the impedance of the second power exchanging coil, and reduce the self-induction losses in the first power exchanging coil. Further details of the operation of system may be referred from the above mentioned description of system of FIG. 3.

Figure 8:
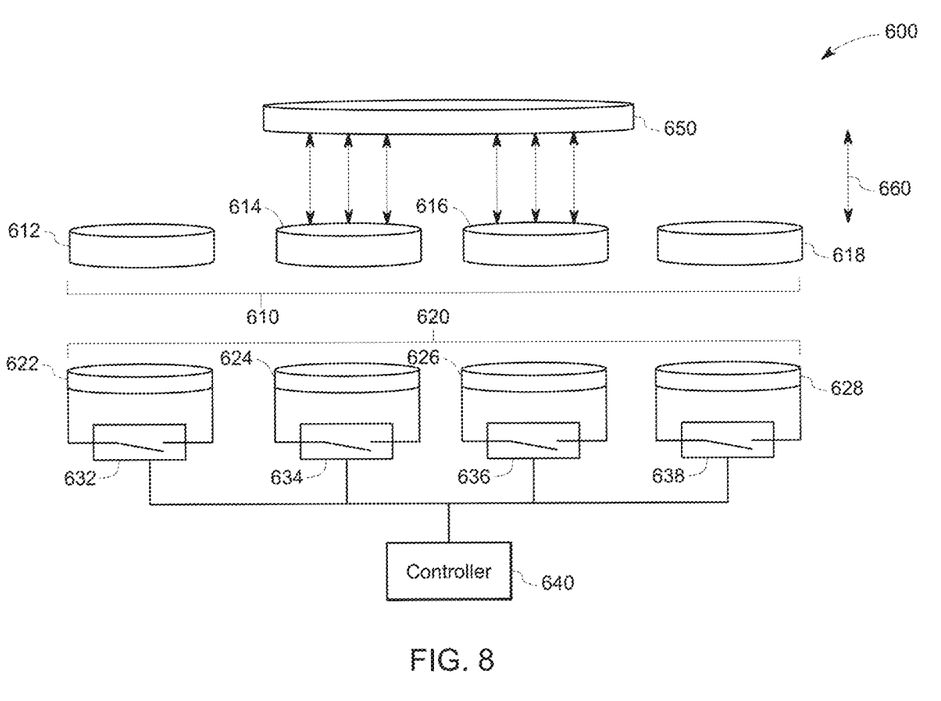
FIG. 8 is a schematic representation of a system for contactless exchange of power including a plurality of first power exchanging coil and a plurality of power mating coils in accordance with an embodiment of the invention.

FIG. 8 is a schematic representation of a system 600 for contactless exchange of power including a plurality of first power exchanging coil 610 and a plurality of power mating coils 620 in accordance with an embodiment of the invention. Each of the plurality of first power exchanging coils 610 is operatively coupled to a corresponding power mating coil 620. Moreover, a plurality of switching units 630 may be operatively coupled to the plurality of power mating coils 620. The plurality of power mating coils may be operatively coupled to a controller 640 and the controller 640 may individually control the plurality of switching units 630 to selectively enable power exchange between one or more first power exchanging coils 610 and one or more second power exchanging coils 650. For example, the system 600 may include four first power exchanging coils represented by reference numerals 612-618. Each of the four first power exchanging coils 612-618 may be individually coupled to four corresponding power mating coils 622-628. Each of the four power mating coils 612-618 may include a corresponding switching unit 632-638 which may be operatively coupled to the controller 640. For illustration purposes, only one second power exchanging coil 650 is represented, however multiple second power exchanging coils 650 may also be used to simultaneously exchange power with the one or more first power exchanging coils 610.

During operation, upon placing the second power exchanging coil 650 within a predetermined distance 660 from the plurality of first power exchanging coils 610, the controller 640 detects the presence of the second power exchanging coil 650 and selects the one or more corresponding first power exchanging coils 614, 616 that may need to be enabled to exchange power with the second power exchanging coil 650. In one embodiment, the controller 640 may detect the presence of the second power exchanging coil 650 based on load detection algorithms that determine variations in an impedance of the plurality of first power exchanging coils during a presence or an absence of the second power exchanging coil 650 in the system 600 for contactless exchange of power. Subsequently, the controller 640 controls the switching units 634, 636 of the corresponding power mating coils 624, 626 to actively control a magnitude and a phase of current in the corresponding power mating coils 624, 626. The active control of the magnitude and the phase of current in the corresponding power mating coils 624, 626 matches the impedance of only the one or more selected first power exchanging coils 614, 616 that were selected by the controller 640 with the second power exchanging coil 650. This enables the exchange of power between one or more selected first power exchanging coil 614, 616 and the second power exchanging coil 650.

Figure 9:
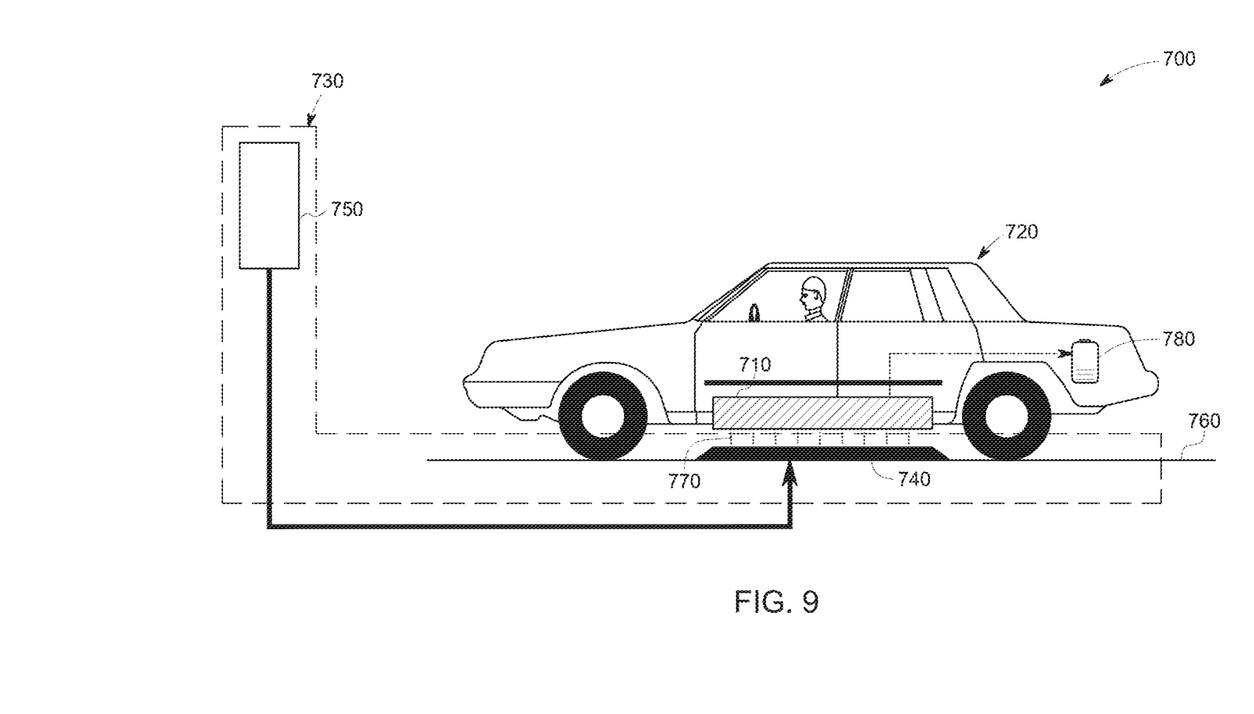
FIG. 9 is a schematic representation of an exemplary electric vehicle charging system including a system for contactless exchange of power in accordance with an embodiment of the invention.

FIG. 9 is a schematic representation of an exemplary electric vehicle charging system 700 including a contactless power transfer system 710 electrically coupled to an electric vehicle 720 for charging the electric vehicle 720 and a charging station 730 electrically coupled to a second power exchanging coil 740 in accordance with an embodiment of the invention. The contactless power transfer system 710 further includes a first power exchanging coil (FIG. 1), a power mating coil (FIG. 1) and a controller (FIG. 1) where the first power exchanging coil may have a first impedance. Furthermore, the charging station 730 is electrically coupled to a power source 750 and the second power exchanging coil 740, where the second power exchanging coil 740 may have a second impedance. The charging station 730 further includes a designated parking area 760 with the second power exchanging coil 740 disposed within the designated parking area 760.

In an exemplary effort to charge the electric vehicle 720, the electric vehicle 720 may be parked in the designated parking area 760 such that a distance between the contactless power transfer system 710 and the second power exchanging coil 740 is within a predetermined distance. However, the first impedance of the first power exchanging coil in the contactless power transfer system 710 may be different from the second impedance of the second power exchanging coil 740 which may lead to incompatibility issues. Therefore, the power mating coil in the contactless power transfer system 710 may modify the first impedance of the first power exchanging coil to match the second impedance of the second power exchanging coil 740. To this end, the controller in the contactless power transfer system 710 determines a duty cycle of a switching unit operatively coupled to the power mating coil and controls switching operations of the switching unit based on the determined duty cycle. Moreover, by controlling the switching operations of the switching unit, the controller actively controls a magnitude and a phase of the current in the power mating coil which in turn modifies the first impedance of the first power exchanging coil to match with the second impedance of the second power exchanging coil 740.

Upon matching the first impedance of the first power exchanging coil with the second impedance of the second power exchanging coil 740, the second power exchanging coil 740 initiates exchange of power by transmitting a magnetic field 770 to the first power exchanging coil. The magnetic field 770 is generated from power received by the second power exchanging coil 740 from the power source 750. The first power exchanging coil receives the magnetic field 770 and converts the magnetic field 770 to power that is further transmitted to an energy storage device 780 electrically coupled to the contactless power transfer system 710. In one embodiment, the energy storage device 780 may include a battery which may be used to operate the electric vehicle 720. In another embodiment, the first power exchanging coil may simultaneously exchange data with the second power exchanging coil 740. In one embodiment, the data may include charging data.

In one embodiment, a field focusing element (FIG. 3) may also be disposed between the first power exchanging coil and the second power exchanging coil 740. In one embodiment, the field focusing element may be disposed in the electric vehicle 720 or in the charging station 730 independent of a location of contactless power transfer system 710. The field focusing element may receive the magnetic field 770 from the second power exchanging coil 740 and may focus a received magnetic field in a direction of the first power exchanging coil or vice versa to further enhance the efficiency of the exchange of power between the contactless power transfer system 710 and the second power exchanging coil 740. In an exemplary embodiment, the field focusing element enables simultaneous bi-directional exchange of power, data, or both.

Figure 10:
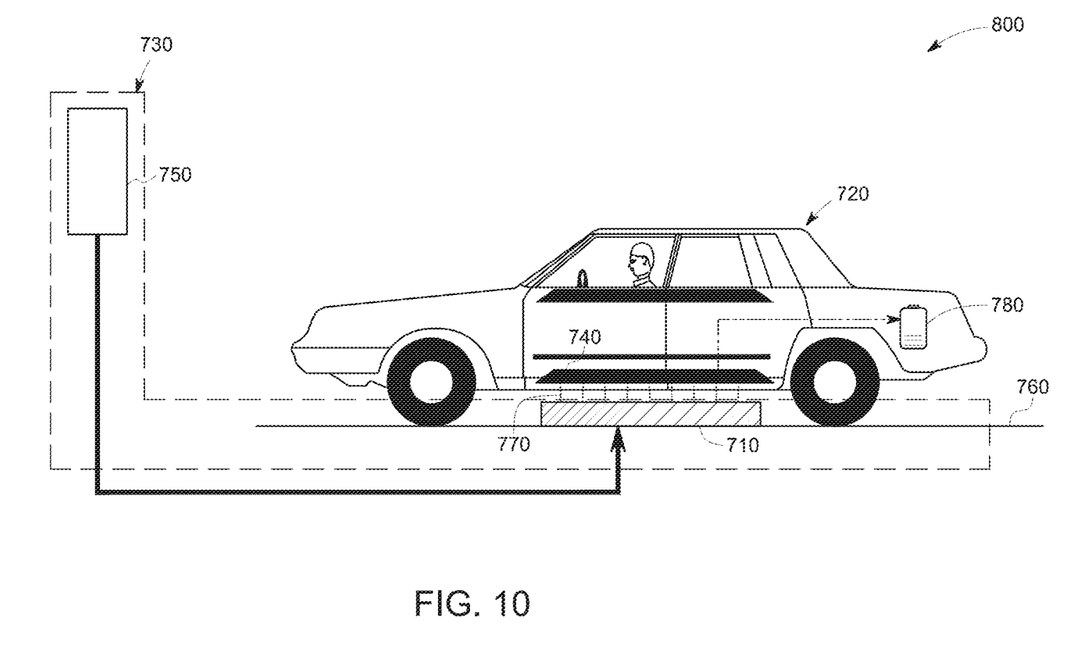
FIG. 10 is a schematic representation of an alternate embodiment of the electric vehicle charging system of FIG. 9 in accordance with an embodiment of the invention.

FIG. 10 is a schematic representation of an alternative embodiment 800 of the electric vehicle charging system of FIG. 9 in accordance with an embodiment of the invention. In this embodiment, the contactless power transfer system 710 may be disposed in the designated parking area 760 and the first power exchanging coil in the contactless power transfer system 710 may be electrically coupled to the power source 750 in the charging station 730. Furthermore, the second power exchanging coil 740 may be disposed in the electric vehicle 720 and may be electrically coupled to the energy storage device 780. However, the operations of the electrical vehicle charging system may remain the same with respect to the operations discussed in FIG. 9. In addition, the second power exchanging coil 740 may also simultaneously exchange data related to the energy storage device 780 with the charging station 730 via the magnetic field 770. In one embodiment, the data may include charging data.

Figure 11:
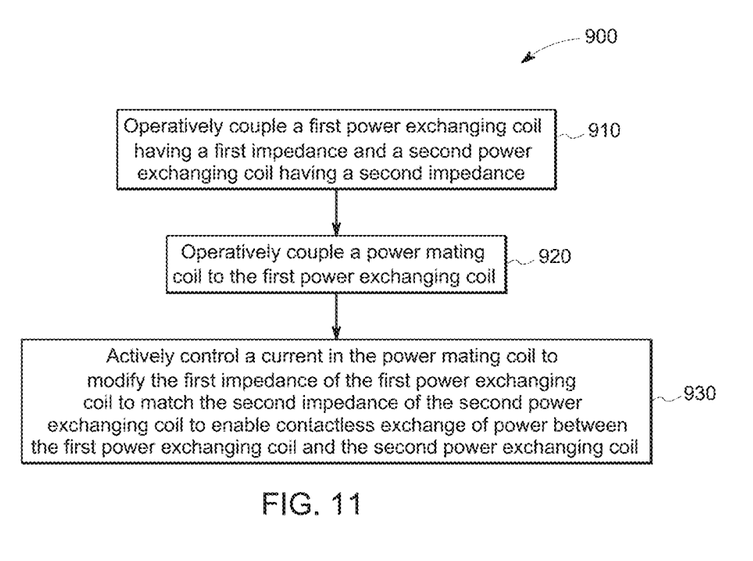
FIG. 11 is a flow chart representing steps involved in a method for contactless exchange of power in accordance with an embodiment of the invention.

FIG. 11 is a flow chart representing steps involved in a method 900 for contactless exchange of power in accordance with an embodiment of the invention. The method 900 includes operatively coupling a first power exchanging coil having a first impedance and a second power exchanging coil having a second impedance in step 910. Furthermore, the first power exchanging coil may be operatively coupled to a power mating coil in step 920. The method 900 may further include actively controlling a magnitude and a phase of current in the power mating coil to modify the first impedance of the first power exchanging coil to match the second impedance of the second power exchanging coil to enable exchange of power between the first power exchanging coil and the second power exchanging coil in step 930. In one embodiment, a frequency sweep may be performed between the first power exchanging coil, the second power exchanging coil and the power mating coil. The frequency sweep determines a duty cycle of a switching unit to modify the first impedance to match the second impedance of the second power exchanging coil and enable the exchange of power between the first power exchanging coil and the second power exchanging coil. In another embodiment, a plurality of first power exchanging coil and a plurality of power mating coils may be provided. Each of the first power exchanging coil may be operatively coupled to corresponding power mating coil, where the current in each of the power mating coils may be individually controlled to match the impedance of the one or more first power exchanging coils with the second impedance of the second power exchanging coils to enable exchange of power between one or more first power exchanging coils and the second power exchanging coil.

It is to be understood that a skilled artisan will recognize the interchangeability of various features from different embodiments and that the various features described, as well as other known equivalents for each feature, may be mixed and matched by one of ordinary skill in this art to construct additional systems and techniques in accordance with principles of this disclosure. It is, therefore, to be understood that the appended claims are intended to cover all such modifications and changes as fall within the true spirit of the invention.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A contactless power transfer system comprising:
    a first power exchanging coil configured for contactless exchange of power;
    a power mating coil operatively coupled to a switching unit; and
    a controller operatively coupled to the switching unit, wherein the controller is configured to control switching operations of the switching unit to actively control a magnitude and a phase of current in the power mating coil to match an impedance of the first power exchanging coil and enable a contactless exchange of power.

2. The contactless power transfer system of claim 1, wherein the first power exchanging coil operates at a first frequency and the power mating coil operates at a second frequency and wherein the first frequency is different from the second frequency.

3. The contactless power transfer system of claim 1, further comprising a second power exchanging coil configured for contactless exchange of power with the first power exchanging coil.

4. The contactless power transfer system of claim 3, wherein the first power exchanging coil is configured to receive power from the second power exchanging coil or transmit power to the second power exchanging coil.

5. The contactless power transfer system of claim 1, further comprising a field focusing element operatively coupled to the first power exchanging coil, the second power exchanging coil or the power mating coil for focusing a magnetic field.

6. The contactless power transfer system of claim 5, wherein the field focusing element comprises at least one resonator, and wherein the at least one resonator is configured to enable a bi-directional transfer of power and data signals between the first power exchanging coil and a second power exchanging coil.

7. The contactless power transfer system of claim 6, wherein the at least one resonator comprises a plurality of resonators arranged in an array and the plurality of resonators focus a resultant magnetic field of the plurality of resonators towards a direction of the first power exchanging coil or a second power exchanging coil.

8. The contactless power transfer system of claim 7, wherein the plurality of resonators are configured to operate at two or more different resonance frequencies simultaneously to enable a simultaneous bi-directional transfer of power and data signals between the first power exchanging coil and the second power exchanging coil.

9. The contactless power transfer system of claim 1, further comprising a plurality of first power exchanging coils and a plurality of power mating coils, wherein each of the first power exchanging coil is operatively coupled to a corresponding power mating coil and the switching units of each of the power mating coils are controlled individually to selectively enable power transfer from one or more first power exchanging coils.

10. The contactless power transfer system of claim 1, wherein the switching unit comprises an insulated gate bipolar transistor (IGBT), a silicon controlled rectifier (SCR), a metal-oxide semiconductor field effect transistor (MOSFET), or a mechanical switch.

11. A system for contactless exchange of power comprising:
a contactless power transfer system comprising:
a first power exchanging coil configured for contactless exchange of power;
a power mating coil operatively coupled to a switching unit; and
a controller operatively coupled to the switching unit, wherein the controller is configured to control switching operations of the switching unit to actively control a magnitude and a phase of current in the power mating coil to match an impedance of the first power exchanging coil and enable the exchange of power; and
a second power exchanging coil operatively coupled to the contactless power transfer system and configured for contactless exchange of power with the first power exchanging coil via a magnetic field.

12. The system of claim 11, wherein the first power exchanging coil and the second power exchanging coil are configured to operate at a first frequency and the power mating coil is configured to operate at a second frequency, wherein the first frequency is different from the second frequency.

13. The system of claim 11, further comprising a field focusing element disposed between the first power exchanging coil and the second power exchanging coil, wherein the field focusing element is configured to focus a magnetic field in a direction of the first power exchanging coil or the second power exchanging coil.

14. The system of claim 13, wherein the field focusing element comprises at least one resonator configured to enable bi-directional transfer of power and data between the first power exchanging coil and the second power exchanging coil.

15. The system of claim 14, wherein the at least one resonator comprises a plurality of resonators arranged in an array, wherein the plurality of resonators focus a resultant magnetic field of the plurality of resonators in a direction of the first power exchanging coil or the second power exchanging coil.

16. The system of claim 15, wherein the plurality of resonators are configured to operate at two or more different resonance frequencies simultaneously to enable a simultaneous bi-directional transfer of power and data signals between the first power exchanging coil and the second power exchanging coil.

17. The system of claim 11, further comprising a plurality of first power exchanging coils and a plurality of power mating coils, wherein each of the first power exchanging coil is operatively coupled to a corresponding power mating coil and the switching units of each of the power mating coils are controlled individually to selectively enable power transfer from one or more first power exchanging coils.

18. A method for contactless exchange of power comprising:
operatively coupling a first power exchanging coil having a first impedance and a second power exchanging coil having a second impedance;
operatively coupling a power mating coil to the first power exchanging coil; and
actively controlling a magnitude and a phase of current in the power mating coil to modify the first impedance of the first power exchanging coil to match the second impedance of the second power exchanging coil to enable contactless exchange of power between the first power exchanging coil and the second power exchanging coil.

19. The method of claim 18, wherein actively controlling the magnitude and the phase of current in the power mating coil comprises performing a frequency sweep between the first power exchanging coil, the second power exchanging coil and the power mating coil, wherein performing the frequency sweep determines a duty cycle of a switching unit operatively coupled to the power mating coil to modify the first impedance to match the second impedance of the second power exchanging coil and enable the contactless exchange of power between the first power exchanging coil and the second power exchanging coil.

20. The method of claim 18, further comprising providing a plurality of first power exchanging coil and a plurality of power mating coils, wherein each of the first power exchanging coil is operatively coupled to a corresponding power mating coil, wherein the current in each of the power mating coils is individually controlled to match the first impedances of the one or more first power exchanging coils with the second impedance of the second power exchanging coil to enable contactless exchange of power between one or more first power exchanging coils and the second power exchanging coil.

* * * * *